United States Patent [19]
Duhame

[11] Patent Number: 5,285,136
[45] Date of Patent: Feb. 8, 1994

[54] CONTINUOUSLY MONITORED SUPPLEMENTAL OBSTRUCTION DETECTOR FOR GARAGE DOOR OPERATOR

[75] Inventor: Dean C. Duhame, Roseville, Mich.

[73] Assignee: Stanley Home Automation, Novi, Mich.

[21] Appl. No.: 20,387

[22] Filed: Feb. 22, 1993

Related U.S. Application Data

[63] Continuation-in-part of Ser. No. 750,102, Aug. 26, 1991, Pat. No. 5,191,268.

[51] Int. Cl.$^5$ .................... E05F 15/16; H02H 7/085
[52] U.S. Cl. .................... 318/266; 318/467; 318/480; 49/25; 49/26
[58] Field of Search ............... 318/264, 265, 266, 275, 318/286, 466, 467, 468, 480; 307/119, 326; 340/825.72, 555, 556; 49/25, 26, 27, 28, 263, 264; 200/61.43; 160/1, 310; 187/DIG. 1

[56] References Cited

U.S. PATENT DOCUMENTS

| | | |
|---|---|---|
| 3,555,535 | 6/1964 | Henriques . |
| 3,689,814 | 9/1972 | Holt . |
| 3,710,050 | 1/1973 | Richards ............... 200/61.43 |
| 3,754,176 | 8/1973 | Miller . |
| 3,783,556 | 1/1974 | Cook . |
| 4,115,952 | 9/1978 | French . |
| 4,239,961 | 12/1980 | Lasar . |
| 4,249,074 | 2/1981 | Zettler et al. . |
| 4,369,344 | 1/1983 | Diamond . |
| 4,386,398 | 5/1983 | Matsuoka et al. . |
| 4,621,452 | 11/1986 | Deeg . |
| 4,706,227 | 11/1987 | DuVall et al. . |
| 4,843,639 | 6/1989 | Beals . |
| 4,866,881 | 9/1990 | Morrow et al. . |
| 4,872,082 | 10/1989 | Martel . |
| 4,914,859 | 4/1990 | Gionet et al. . |
| 4,922,168 | 5/1990 | Waggamon et al. . |
| 4,953,608 | 9/1990 | Larsson . |
| 5,087,799 | 2/1992 | Pariot et al. . |

Primary Examiner—Bentsu Ro
Attorney, Agent, or Firm—Krass & Young

[57] ABSTRACT

An automatic door operator with a continuously monitored supplemental obstruction detector. In a first embodiment, the obstruction detector is a radiant beam obstruction detector that transmits a beam of modulated radiant energy across the door opening. A safety signal generator produces an active safety signal only on unobstructed receipt of radiant energy by a receiver. Failure to receive the active safety signal when the motor is closing the door at least stops the door. A two wire cable, which carries both power and the active safety signal, connects the supplemental obstruction detector to the automatic door operator. Constant activation of a portable transmitter or of a local push button can override the supplemental obstruction detector to close the door. An alternative supplemental obstruction detector includes a safety edge having a compressible tube disposed on a leading end of the door. Plural conductors change their conductive state upon compression of the compressible tube. An oscillator sealed within the tube at one end supplies the safety signal. This embodiment may include a delay upon detection of compression of the compressible tube so that contact with the floor is not detected as an obstruction.

12 Claims, 3 Drawing Sheets

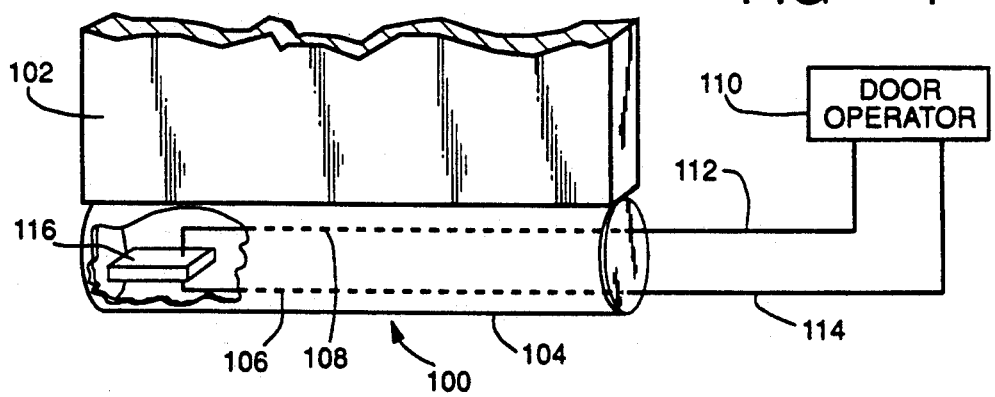
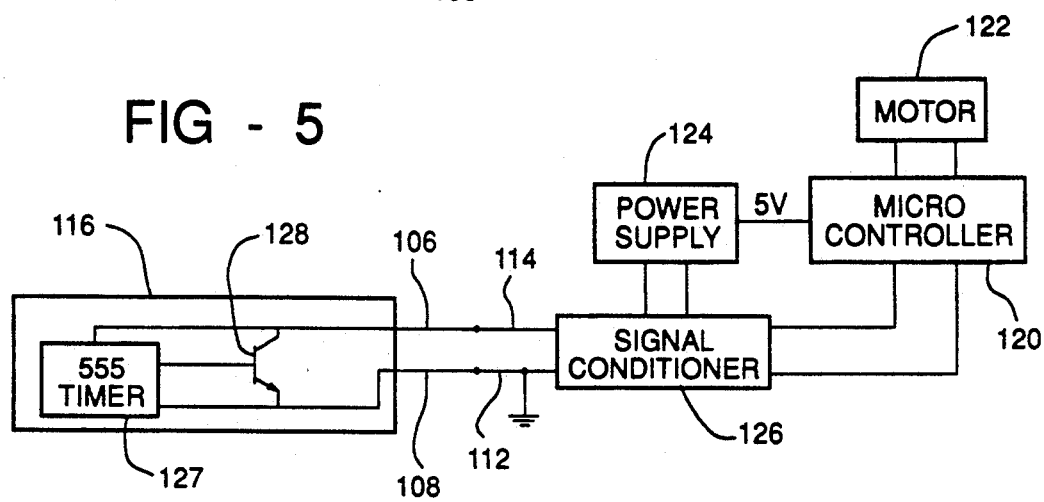
 
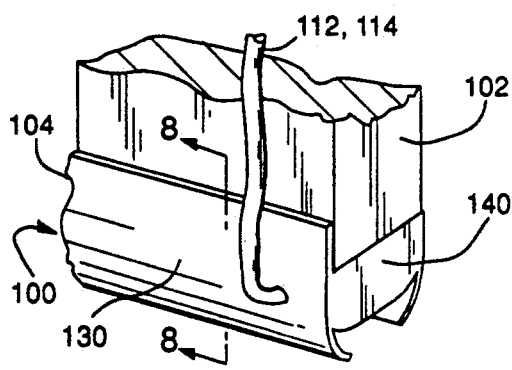 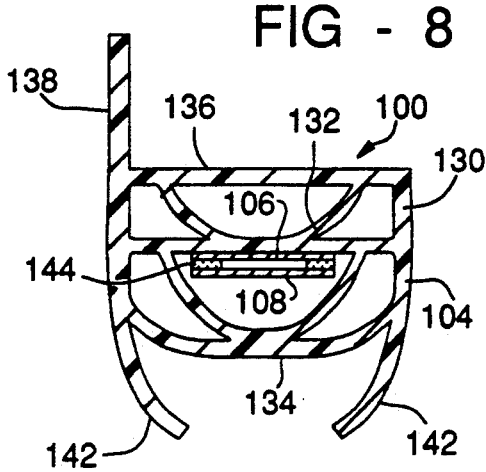

1

CONTINUOUSLY MONITORED SUPPLEMENTAL OBSTRUCTION DETECTOR FOR GARAGE DOOR OPERATOR

RELATED APPLICATIONS

This application is a continuation-in-part of Ser. No. 07/750,102, filed Aug. 26, 1991, now U.S. Pat. No. 3,191,268.

TECHNICAL FIELD OF THE INVENTION

The technical field of the present invention is that of obstruction detectors for automatic door operators such as used for garage doors. In particular, this invention is in obstruction detectors which supplement the prior art primary obstruction detector.

BACKGROUND OF THE INVENTION

The present invention is in automatic door operators such as used in garage doors. Such automatic door operators typically employ a motor to move the door between an opened and a closed position in response to control signals. A wall mounted push button and a portable radio frequency transmitter are generally provided to generate these control signals.

It has been known for many years that such automatic garage door operators need some form of obstruction detection. Obstruction detection prevents personal injury or property damage caused by the controlled door closing on something. Obstruction detection also prevents damage to the door and the various driving components that would result from operation against an obstacle.

SUMMARY OF THE INVENTION

This invention is in automatic door operators. Such automatic door operators have a motor coupled for moving a door between an open position and a closed position covering an opening, and a controller controlling operation of the motor corresponding to command signals. The present invention is a continuously monitored obstruction detector.

In a first embodiment, the obstruction detector is a radiant beam obstruction detector. The radiant beam obstruction detector includes a transmitter for transmitting a beam of radiant energy across the opening and a receiver for receiving radiant energy. The radiant signal is preferably modulated at the transmitter and demodulated at the receiver to insure the received signal is the transmitted signal. A level sensing inhibits generation of the safety signal if the magnitude of radiant energy received by said receiver exceeds a predetermined amount. This is to filter out extraneous signals of the same type as the transmitted radiant signal.

A safety signal generator produces an active safety signal upon unobstructed receipt of radiant energy by the receiver and does not generate this active safety signal upon failure to receive this radiant energy. The controller of the automatic door operator is connected to the radiant beam obstruction detector and operates to at least stop the motor to stop movement of the door upon failure to receive the active safety signal when the motor is closing the door. The radiant beam obstruction detector includes a lamp providing a visual indication of whether the receiver receives an unobstructed signal. The obstruction detector may further include an annunciator that sounds upon failure of unobstructed receipt of radiant energy by said receiver.

This radiant beam obstruction detector preferably requires electrical connection at only one side of the opening. This is achieved by disposing the transmitter and receiver in a housing on a first side of the opening. The transmitter directs the radiant beam to a reflector on the other side of the opening. This reflector reflects the radiant beam to the receiver for detection.

The present invention preferably includes a two wire cable connecting the supplemental obstruction detector to the controller of the automatic door operator. The controller supplies power for operation of the supplemental obstruction detector via these two wires. The supplemental obstruction detector signals the controller via the same two wire cable.

A safety signal generator transmits an active safety signal by repetitively shorting the two wires at a predetermined rate. This predetermined rate is preferably less than 100 Hz and may be in the range between 33 Hz and 50 Hz. This pulse rate minimizes production of radio frequency interference. The failure to detect this active safety signal is interpreted as an obstruction. An open or short of the two wires is detected as a system failure or obstruction. Note that the supplemental obstruction detector is employed only for closing the door. When opening the door the signal from the supplemental obstruction detector is ignored.

The controller includes a provision to override the obstruction signal to close the door. Constant activation of the portable transmitter or constant depression of the local push button overrides the obstruction detector. In an alternative embodiment, only constant depression of the local push button will override the obstruction detector permitting closure of the door.

A compressible obstruction detector is proposed as an alternative to the radiant beam obstruction detector. This compressible obstruction detector, also known as a safety edge, includes a compressible tube disposed on a leading end of the door. Such safety edges are available in both normally open, normally closed varieties as well as a hybrid variety with both normally open and normally closed contacts. These safety edges come in varieties having 2, 3 or four conductors. A safety signal generator connected to these conductors generates an active safety signal supplied to the controller when the state of the conductors indicates no obstruction has been encountered. The controller operates the same way as previously described, at least stopping the motor to stop movement of the door upon failure to receive the active safety signal. In a preferred embodiment, external conductors coupled to the controller are connected to one end of the safety edge and an oscillator is sealed within the safety edge at the other end thereof. The oscillator is powered by the conductors in the safety edge and generates the safety signal which is carried to the controller to verify operability of the safety edge.

BRIEF DESCRIPTION OF THE DRAWINGS

These and other objects and aspects of the present invention will become clear from the following description of the invention, in which:

FIG. 4 is a schematic illustration of an automatic door operator with a door edge obstruction sensor according to the invention;

FIG. 5 is an electrical schematic diagram of the system of FIG. 4;

FIGS. 6A and 6B are illustrations of square wave signals developed in different parts of the system of FIG. 5;

FIG. 7 is a partial isometric view of a physical embodiment of the door edge sensor of FIG. 4; and FIG. 8 is a cross section of a door edge obstruction sensor taken along line 8—8 of FIG. 7.

DETAILED DESCRIPTION OF THE PREFERRED EMBODIMENTS

Figure 1:
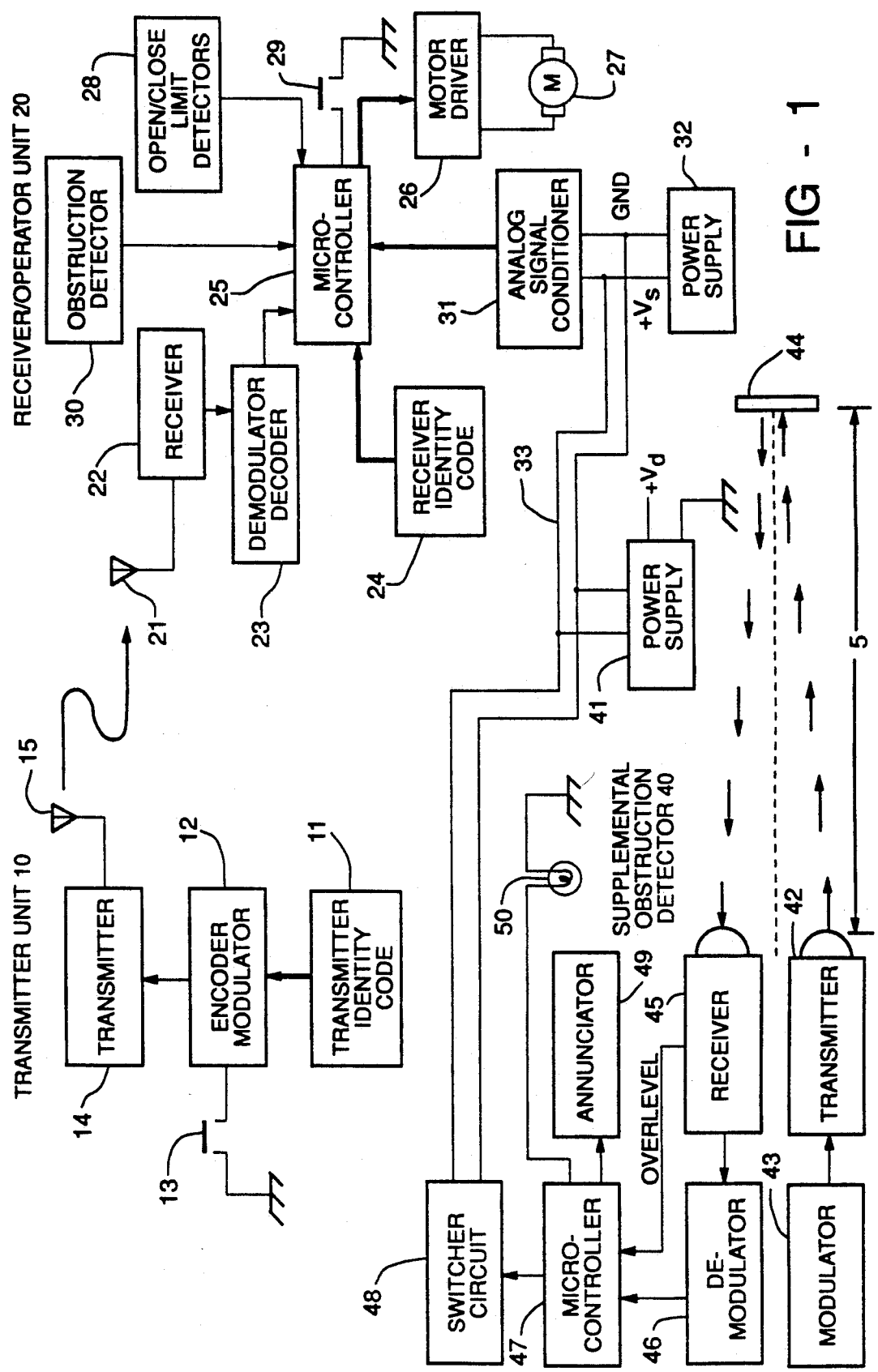
FIG. 1 is a schematic diagram illustrating the preferred embodiment of this invention.

FIG. 1 illustrates in block diagram form the major components this invention as used in a residential garage door operator. These components include a transmitter 10, a receiver/operator 20 and a supplemental obstruction detector 40. The typical system would include a single receiver/operator 20 with a corresponding supplemental obstruction detector 40 and one or more transmitters 10. FIG. 1 illustrates a single transmitter 10 for the sake of brevity.

Transmitter 10 includes a transmitter identity code setting device 11, an encoder/modulator 12, a momentary contact push button switch 13, a radio frequency transmitter 14 and an antenna 15. The user operates transmitter 10 by pressing push button switch 13. Encoder/modulator 12 reads the identity code set by transmitter identity code setting device 11 upon operation of push button switch 13. Encoder/modulator 12 then activates transmitter 14 to produce a radio frequency signal on a fixed frequency. Encoder/modulator 12 also modulates the transmission of transmitter 14 with the transmitter identity code. Transmitter 14 radiates this modulated radio frequency signal via antenna 15.

According to one technique known in the art, transmitter identity code setting device 11 is a set of manually operable switches. Each switch has two positions for selection of a digital "1" or "0" for the corresponding bit of the code. It is known in the art to provide the set of switches in a dual in line package. This package is of the same type used to house integrated circuits and is readily mounted on a printed circuit board. It is also known in the art to provide such a code setting device with 10 switches permitting the setting of one of $2^{10}$ or 1024 possible codes.

Receiver/operator 20 operates the garage door via a motor 27 according to radio frequency signals received from a transmitter 10 and other input signals. Radio frequency signals received by antenna 21 are coupled to receiver 22. Demodulator 23 demodulates any identity code modulated on the received radio frequency signal. Demodulator 22 also supplies this demodulated identity code to microcontroller 25. Microcontroller 25 determines if the demodulated identity code matches the receiver identity code set by receiver identity code setting device 24. Receiver identity code setting device 24 is preferably a set of switches disposed in a dual in line package of the same type as transmitter identity code setting device 11.

Microcontroller 25 operates motor controller 26 upon receipt of a demodulated identity code from demodulator 23 which matches the identity code set by receiver identity code setting device 24. Motor controller 26 in turn controls motor 27 for movement of the garage door. Motor 26 is mechanically coupled to the door in a manner known in the art. It is known in the art to operate the door in a circular four phase sequence to 1) open the door, 2) stop, 3) close the door, and 4) stop upon each receipt of a properly encoded radio frequency signal. Open and close limit detectors 28 signal microcontroller 25 to stop motor operation upon reaching the fully closed and the fully opened positions in a manner known in the art. It is also known in the art to provide momentary contact push button switch 29 directly coupled to microcontroller 25. Microcontroller 25 controls the garage door in response to activation of push button 29 in a manner similar to operation upon receipt of a properly coded radio frequency signal. Microcontroller 25 is preferably embodied in a microprocessor circuit having read/write random access memory and a control program fixed in read only memory.

The provision of a multibit signal encoded in the radio frequency transmissions serves a security function. This insures that receiver/operator 20 is not responsive to every radio frequency transmission but only to those properly encoded. Transmission of the properly encoded signal is analogous to selection of the proper key for operating a lock. Provision of identity code setting devices 11 and 24 as manually operable switches permits the user to control the code used. Generally identity code setting devices 11 and 24 may be accessed only by opening door or removing a panel. The user may at any time select an arbitrary one of the 1024 feasible codes at receiver/operator 20 by changing the switches in receiver identity code setting device 24. A similar change made in transmitter identity code setting device 11 in each of the transmitter units 10 permits these units to control to door. Note that this description is by way of example only and that there are other methods for selecting and entering the identity codes known in the art.

Receiver/operator 20 includes an obstruction detector 30. It should be clear that a mechanically operated door poses a hazard to person and property under certain conditions. Children are particularly at risk because they might carelessly play with the automatic garage door operator. Thus automatic garage door operators generally include some form of obstruction detection. FIG. 1 illustrates this in the form of obstruction detector 30. An obstruction detection technique known in the art uses the tension of the drive train. Generally motor 27 is coupled to the door via a chain or screw drive. A switch is mechanically coupled to the drive train. This switch is normally closed but is opened when the drive train tension exceeds a predetermined amount. Microcontroller 25 detects the state of this switch and aborts the door operation when it trips. Typically microcontroller 25 stops the door upon detection of an obstruction while opening and stops the door and reverses to the fully open position upon detection of an obstruction while closing.

It is increasingly being realized that this type of obstruction detection is insufficiently sensitive to prevent all possible injuries. There are state regulatory authorities proposing regulations requiring additional obstruction detectors. One on the types of additional obstruction detectors under consideration is radiant obstruction detectors. A radiant beam, generally infrared or visible light, is projected across the lower portion of the opening of the controlled door. Interruption of the radiant beam is interpreted as detection of an obstruction and the automatic door operator takes appropriate remedial action. A second type of additional obstruction detector is a pressure sensitive strip disposed on the leading edge of the controlled door. These pressure sensitive strips are known as safety edges. Detection of pressure on this pressure sensitive strip indicates an obstruction. Note that these additional obstruction detectors generally operate only while closing the door. Since door closing is known to the most dangerous operation of automatic garage doors, this limitation does not severely restrict the utility of these additional obstruction detectors.

FIG. 1 also illustrates supplemental obstruction detector 40. Certain parts of receiver/operator 20 cooperate with supplemental obstruction detector 40 to control door operation. Receiver/operator 20 is coupled to supplemental obstruction detector 40 via wires 33. Wires 33 preferably comprise a twisted pair of wires. Receiver/operator 20 supplies electric power to supplemental obstruction detector 40 via wires 33. Power supply 32 couples a supply voltage $+V_s$ across wires 33. Power supply 41, located in supplemental obstruction detector 40, extracts the electric power from wires 33 and produces an operating voltage $+V_d$ for use by the powered components of supplemental obstruction detector 40. The active safety signal from switcher circuit 48 is detected by analog signal conditioner 31.

Supplemental obstruction detector 40 includes a transmitter 42 for transmission of a radiant beam. Transmitter 42 preferably generates infrared light. Other forms of radiant energy, such as visible light and ultrasound are also feasible. Modulator 43 modulates the transmission of transmitter 42. The manner of this modulation and the reason for employing modulation will be explained below.

The radiant energy produced by transmitter 42 is directed across opening 5. Opening 5 is the opening corresponding to the garage door. A reflector 44 disposed at the far side of opening 5 reflects this radiant beam. At least some of the reflected radiant energy reaches receiver 45. This reflection technique, which is known in the art, is used for several reasons. Electric power and signal lines need only be routed to one side of opening 5 because reflector 44 is completely passive. This saves installation labor and expense. This technique also reduces the effort required to align transmitter 42 and receiver 45. Transmitter 42 and receiver 45 may be manufactured in a pre-aligned package. Reflector 44 retroreflects the radiant beam from a range of angles. This can be accomplished using corner reflectors. Thus proper alignment only requires alignment of the combined transmitter/receiver toward reflector 44, while reflector 44 may be in a range of orientations.

Receiver 45 detects the radiant beam reflected by reflector 44. This radiant beam has a modulation imparted by modulator 43. Demodulator 46 detects the modulation imparted on the radiant beam by modulator 43. If the radiant beam received by receiver 45 includes this modulation, then demodulator 46 signals microcontroller 47 that the radiant beam is not interrupted. This modulation on the radiant beam serves to distinguish the proper signal from any other signals that may be received by receiver 45. When using infrared light, for example, receiver 45 may give a false positive signal in the presence of direct or reflected sunlight.

Microcontroller 47 employs the signal from demodulator 46 to control signaling receiver/operator 20 via switcher 48, actuation of annunciator 49 and illumination of lamp 50. The detection of a properly modulated signal by demodulator 46 indicates that the opening 5 is unobstructed. Microcontroller 47 preferably controls switcher 48 to produce an active safety signal when opening 5 is unobstructed. This provides a fail safe mechanism if some fault in wires 33 between receiver/operator 20 and supplemental obstruction detector 40.

This active safety signal produced by switcher circuit 48 is detected by analog signal conditioner 31. Analog signal conditioner 31 preferably employs a level sensor which detects when the signal exceeds a threshold. This threshold is set between ground and the voltage $V_s$ produced by power supply 32. It is envisioned that the voltage $V_s$ produced by power supply 32 is 5 volts and that the threshold of analog signal conditioner 31 is set at 4 volts. Analog signal conditioner 31 produces a switching signal only when the active safety signal regularly crosses the threshold of the level sensor. Microcontroller 25 is programmed to expect this switching signal and to indicate an obstruction or some system fault upon failure to detect this switching signal.

Receiver 45 additionally detects the received radiant signal level. If this received radiant signal level exceeds a predetermined level, then receiver 45 generates an overlevel signal. The predetermined level is set above the maximum expected received radiant signal level for the smallest opening 5. Microcontroller 47 controls switcher circuit 48 to stop generation of the active safety signal upon receipt of the overlevel signal from receiver 45. This received overlevel signal is an indication of some fault in supplemental obstruction detector 40 and receiver/operator 40 takes the same remedial action as if an obstruction has been detected.

Figure 2:
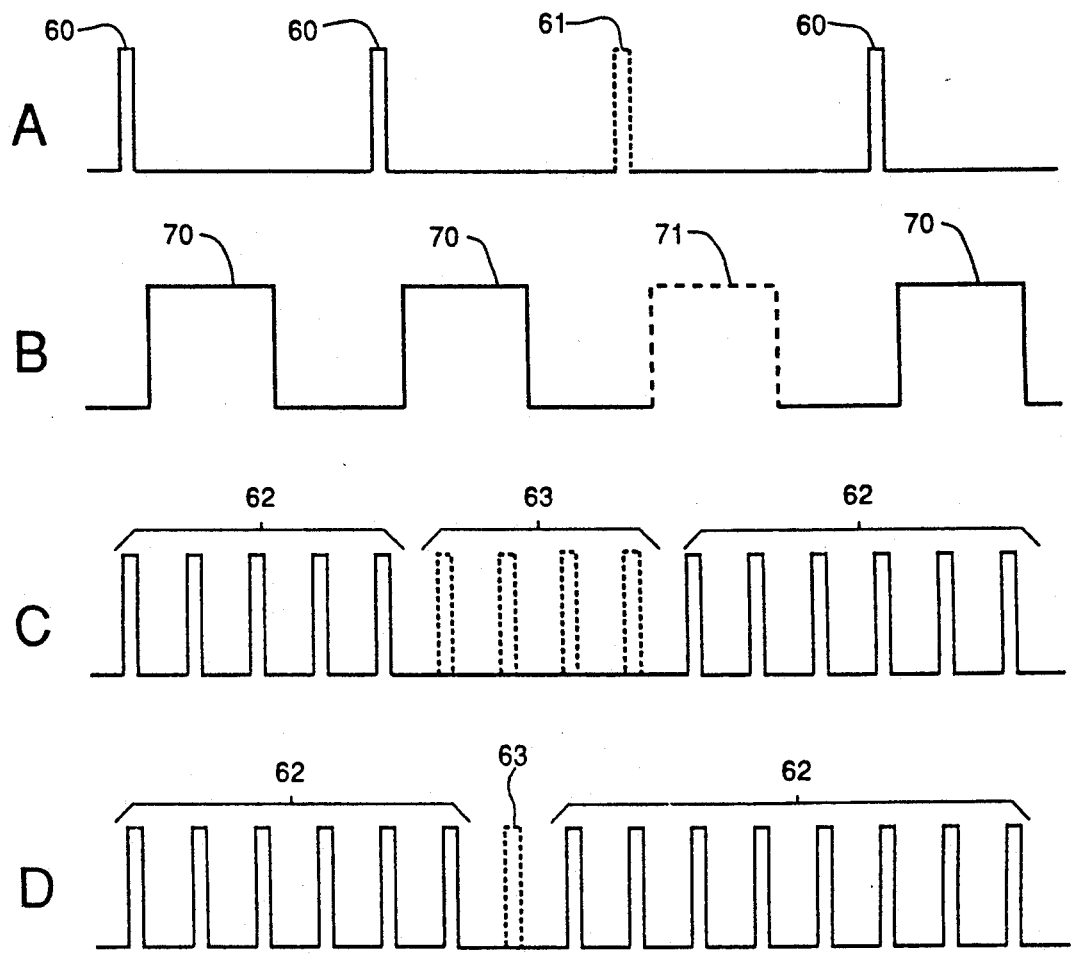
FIG. 2 is a timing diagram illustrating examples of various signals in the present invention.

FIGS. 2a to 2d illustrate various signals useful in understanding the operation of the supplemental obstruction detection system of this invention. FIG. 2a shows an example of a received and demodulated signal from demodulator 46. Modulator 43 modulates transmitter 42 to produce radiant energy in pulses. These pulses are received and detected by receiver 45 and demodulator 46 in the form of pulses 60. Each transmitted pulse may also include additional modulation imparted by modulator 43 that has been demodulated by demodulator 46. Transmission of pulses at a relatively low duty cycle is preferred to reduce the consumption of electric power within supplemental obstruction detector 40.

FIG. 2a illustrates pulses 60 occurring at regular repetitive intervals. As noted above these pulses 60 correspond to pulses of radiant energy produced by transmitter 42. At 61 a pulse is missing, indicating interruption of the radiant beam. Microcontroller 47 controls switcher circuit 48 to signal receiver/operator 20 via wires 33. Normally switcher circuit 48 produces a square wave signal such as illustrated in FIG. 2b. Each pulse 70 corresponds to a received pulse 60. Note missing pulse 71 corresponding to missing pulse 61.

Supplemental obstruction detection system need not operate on the one to one ratio of pulses as illustrated in FIGS. 2a and 2b. Because of the length of wires 33, the pulse rate transmitted via these wires should be relatively to minimize radio frequency interference generation. A pulse repetition rate of less than 100 Hz and preferably between 33 and 50 Hz would provide sufficiently low radio frequency interference generation for most installations. On the other hand, transmitter 42 may operate at a higher rate. The repetition rate of transmitter 42 is related to the shortest duration obstruction that needs to be detected. Accordingly, microcontroller 47 may be programmed to receive pulses at a first rate and control switcher circuit 48 to operate at a lower pulse repetition rate. FIG. 2c illustrates pulses 62, which occur at a rate four times faster than pulses 70. During interval 63 the pulses are missing. This indicates that the radiant beam has been interrupted. Accordingly, microcontroller 47 controls switcher circuit 48 to produce the same output as illustrated in FIG. 2b as in the prior example.

Microcontroller 47 can be made more sensitive when transmitter 42 operates at a higher rate than switcher circuit 48. FIG. 2d shows pulses 62 with a single missing pulse at 63. Microcontroller 47 is responsive to the single missing pulse, indicating momentary interruption of the radiant beam, to omit one pulse 71 as illustrated in FIG. 2b. Alternatively, microcontroller 47 may require more than one missing transmission before omitting one pulse 71. By this means, receiver/operator 20 may be responsive to momentary interruption of the radiant beam that is shorter in time than the pulse period of pulses 70.

Supplemental obstruction detector 40 may include annunciator 49 that is used to signal the user. Annunciator 49 audibly signals when microcontroller 47 detects interruption of the radiant beam. Preferably microcontroller 25 activates annunciator 49 only when the interruption of the radiant beam is longer a predetermined period of time. This predetermined period of time should be about five seconds. Thereafter annunciator 49 may continuously sound or may be pulsed. This audible alarm serves to alert the user only if the door is obstructed for longer than the predetermined period of time. Thus the user is not annoyed by momentary interruptions of the radiant beam, such as persons passing in and out of the open garage door.

Lamp 50 aids in initial alignment of supplemental obstruction detector 40. Lamp 50 preferably operates in one of two alternate modes. In the first mode, lamp 50 blinks upon application of electric power to supplemental obstruction detector 40 when the radiant beam is interrupted and is continuously on when the radiant beam is not interrupted. Thus the operator can view lamp 50 from either the location of transmitter 42 and receiver 45 or from the location of reflector 44 to determine if the radiant beam has been properly aligned during installation of supplemental obstruction detector 40. This can be particularly useful when installing reflector 44. In the alternative mode, the roles of blinking and constant illumination of lamp 50 are reversed. Thus lamp 50 is continuously on upon application of electric power to supplemental obstruction detector 40 when the radiant beam is interrupted and blinks when the radiant beam is not interrupted. As a further alternative, lamp 50 remains off when receiver 45 does not receive the radiant signal and blinks when receiver 45 receives the radiant signal. In any case the installer can determine when the supplemental obstruction detector 40 is properly installed by observing lamp 50. In this regard it is preferable that microcontroller 47 not activate annunciator 49 except upon interruption of the radiant beam, that is, only after proper reception of the radiant beam followed by failure of reception. This prevents annoying activation of annunciator 49 until after alignment of the radiant beam.

Receiver/operator 20 preferably includes some manner of closing the door even after failure of supplemental obstruction detector 40. This would permit use of the controlled door during the interval between failure of supplemental obstruction detector 40 and its repair. In the preferred embodiment the door can be closed by constant operation of transmitter 10 via push button 13 or by constant operation of push button 29, even if supplemental obstruction detector 40 fails to generate the active safety signal. This requirement of constant operation, requiring constant operator attention, alerts the operator to take special care in observing the door operation to look out for obstructions. In an alternative embodiment of this feature, the door may be closed only upon constant operation of push button switch 29 and not by constant operation of push button 13. This serves to further emphasize to the user the need for caution.

The supplemental obstruction detector shown in FIG. 1 and described above is not without problems. With some types of doors an obstruction may be located in a position not protected by the radiant signal. This is particularly true of one piece doors which tend to swing well outside of the door threshold when closing. A supplemental obstruction detector that attaches to the leading edge of the door is better suited to these doors. Obstruction detectors of this type are known in the art. These safety edges may be constructed to operate in a normally open mode or in a normally closed mode. A safety edge constructed to be normally open typically includes a pair of conductors disposed in a resilient tube. Normally this pair of conductors are electrically isolated. When the safety edge meets an obstruction, the resilient tube collapses causing the pair of conductors to electrically contact. Normally closed safety edges operate in a similar fashion except that the pair of conductors are normally connected electrically and are electrically isolated upon contact with an obstruction. In either case the change in conductive condition indicates contact with an obstruction. It is also known in the art to provide a hybrid safety edge with a combination of normally open and normally closed conductors with either three conductors, where a common conductor is user in both the normally open and the normally closed circuits, or four conductors, where the normally open and normally closed circuits are separate. These safety edges have heretofore not been employed with an active safety signal.

Figure 3:
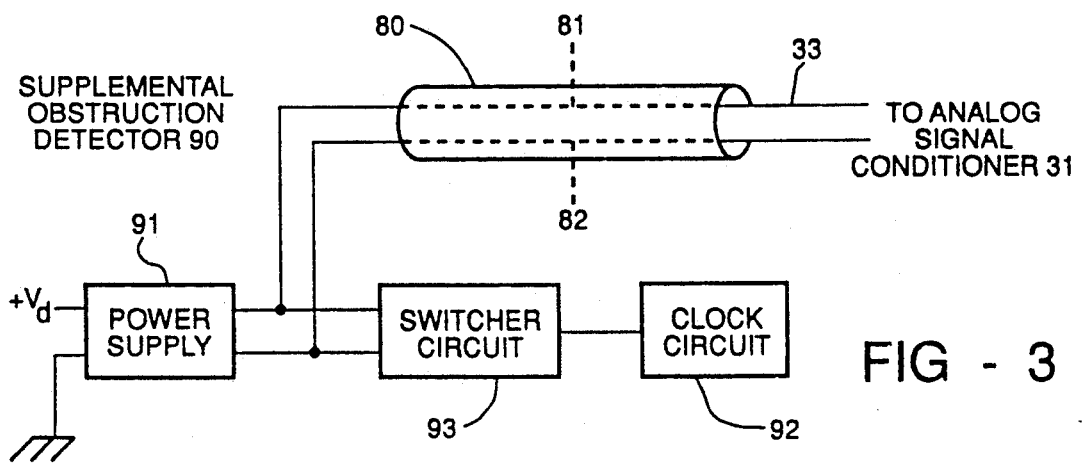
FIG. 3 is a schematic diagram illustrating an alternative embodiment of this invention employing a safety edge.

FIG. 3 illustrates an alternative embodiment of the supplemental obstruction detector employing a normally open safety edge. Supplemental obstruction detector 90 is employed with the known safety edge 80. Safety edge 80 is disposed on the leading edge of the door. Safety edge 80 includes a resilient tube having conductors 81 and 82. When safety edge 80 meets an obstruction, this tube collapses causing conductors 81 and 82 to electrically contact.

Supplemental obstruction detector 90 is electrically connected to the far end of safety edge 80. Power supply 91 receives power from conductors 81 and 82 to power clock circuit 92 and switcher 93. Clock circuit 92 controls switcher 93 to produce the cycling signal illustrated in FIG. 2b. Receiver/operator 20 receives this signal via analog signal conditioner 31 and employs it in the same manner as previously described. A cycling signal indicates a properly operating obstruction detector that has not detected an obstruction. A non-cycling signal indicates detection of an obstruction or the existence of a fault. When safety edge 80 encounters and obstacle, this shorts the supply of electric power to supplemental obstruction detector 90 and also shorts the transmission of the active control signal, thus indicating an obstruction to the receiver/operator 20.

In FIG. 4, a safety edge 100 is attached to the leading edge or bottom edge of a garage door 102. The safety edge 100 comprises a compressible tube 104 and a two normally open conductors 106 and 108 connected at one end of the tube 104 to a door operator 110 via terminal conductors 112 and 114. The other ends of the conductors 106 and 108 are connected to a safety signal generator which comprises an active modulator or oscillator 116. The oscillator 116 is fixed relative to the door 102 to move therewith and preferably resides within the compressible tube 104. The door operator 110 supplies electrical power to energize the conductors 106, 108 via the terminal conductors 112 and 114, and to activate the oscillator which imposes a safety signal on those conductors. If the safety signal reaches the door operator, it signifies that the safety edge is operating normally and there is no obstruction. In the case of obstruction, however, the signal will be interrupted and the operator will stop the door, if it is closing, and may reverse the door movement as well.

The circuit of FIG. 5 further elaborates on the FIG. 4 arrangement. The door operator comprises a microcontroller 120 which actuates the motor 122 for opening and closing the door 102. A power supply 124 furnishes 5 volt power to the microcontroller and unregulated power ranging from 15 to 28 volts to a signal conditioner 126. The conductors 106, 108, 112, and 114 connect the signal conditioner to the oscillator 116. The signal conditioner serves two functions: supplying unregulated power to the oscillator, and conditioning the modulated signal from the oscillator for input to the microcontroller 120. The terminal conductor 112 is shown to be grounded; this is effected by the signal conditioner 126.

The oscillator 116 may take any of many well-known forms. For example, it can be a 555 timer 127 set to oscillate at a fixed frequency and a 50% duty cycle, and a transistor switch 128 controlled by the timer for cyclically connecting the conductors 106 and 108. The resulting signal is a square wave voltage, as shown in FIG. 6A, which alternates between the unregulated voltage and a value near ground. The signal conditioner 126 converts the unregulated square wave to a 5 volt square wave, shown in FIG. 6B, for input to the microcontroller, provided the proper voltage swing appears on terminal conductor 114. The signal conditioner compares the low voltage on conductor 114 to 1 volt and the high voltage to 8 volts. If the low voltage is more than 1 volt or the high voltage is less than 8 volts, the signal is considered to be corrupted and no square is fed to the microcontroller, to indicate that an obstruction is detected or the safety edge or a conductor is defective.

The microcontroller 120 monitors the frequency of the 5 volt square wave for an additional check on system integrity. Where a door operator is furnished with either a safety edge or a light beam type obstruction detector, it is advantageous to employ the same type of modulation for both types so that the same signal conditioner can be used and it will process the signals from either type of detector in the same way.

A physical embodiment of a safety edge is illustrated in FIGS. 7 and 8. The tube 104 comprises several longitudinally extending closed cells defined by outer walls 130 and inner webs 132 which lend structural integrity to the edge while allowing compression when pushed from the lower surface 134. A flat upper wall 136 seats against the bottom of the garage door 102 and a stiff upwardly extending flange 138 allows attachment to the door. Both ends 140 of the tube is sealed. Lower depending flexible flanges 142 contact the floor and conform to floor contours when the door is closed. Within one of the longitudinal cells, the conductors 106 and 108 reside in the form of flexible flat metal strips separated by a low density foam spacer 144. The spacer prevents contact of the strips until pressure is applied via the lower surface 134. The conductors 106 and 108 join the conductors 112, 114 within the tube near one end thereof and the latter pass through the wall 130 of the tube 104.

It will thus be seen that a safety edge for a door of the compressible tube type advantageously includes an active modulator mounted on the door and coupled to the conductors of the safety edge. It is particularly advantageous to mount such a modulator within the compressible tube and sealed therein for protection from the elements, the modulator being mounted at one end of the tube and external terminal wires connected at the other end of the tube.

I claim:

1. In an automatic door operator having a motor coupled for moving a door between an open and a closed position covering an opening in response to command signals and for reacting to a door obstruction, the improvement comprising:
   an obstruction sensor attached to the leading edge of the door, the obstruction sensor comprising a compressible element having first and second ends and at least a pair of conductors extending between the first and second ends, the conductors having a conducive relationship subject to change in response to compression of the compressible element by an obstruction;
   a controller controlling operation of the motor corresponding to the command signals;
   an electrical coupling between the controller and at least one of the conductors at the first end of the obstruction sensor for supplying electrical power to the conductors;
   an oscillator coupled to the conductors at the second end of the obstruction sensor for receiving power from the conductors in the absence of the obstruction and for imparting an oscillating signal to the conductors, whereby the oscillating signal is fed by the electrical coupling to the controller in the absence of the obstruction and the oscillating signal is no fed to the controller when the conducive relationship is changed in response to compression of the compressible element by the obstruction;
   the controller being responsive to the oscillating signal for responding to the command signals during the presence of the oscillating signal and for at least stopping the motor to stop the door in the absence of the oscillating signal when the motor is closing the door.

2. The invention as defined in claim 1 wherein the oscillator is fixed relative to the door for movement therewith.

3. The invention as defined in claim 1 wherein the oscillator is mounted within the obstruction sensor at the second end thereof.

4. The invention as defined in claim 1 wherein in the absence of the obstruction the conductors are in nonconductive relationship and the controller applied a voltage across the conductors, and the oscillator includes means for periodically connecting the conductors to modulate the applied voltage.

5. The invention as defined in claim 4 wherein the controller includes means for sensing the modulation of the applied voltage and the variance of the modulation from a prescribed condition.

6. The invention as defined in claim 1 wherein the controller includes a microprocessor responsive to the oscillating signal and a signal conditioning means for supplying power to the conductors via the electrical coupling and for supplying a conditioned oscillating signal to the microprocessor when the oscillating signal is present.

7. The invention as defined in claim 1 wherein the obstruction sensor comprises a tube sealed at the first and second ends and the oscillator is sealed within the tube.

8. The invention as defined in claim 7 wherein the electrical coupling includes a pair of terminal conductors extending through the tube proximate the first end and connected to the conductors at the first end.

9. The invention as defined in claim 1 wherein the conductors comprise two conductors normally spaced when the compressible element is not compressed and arranged to make contact when the compressible element is compressed.

10. An obstruction sensor for a door edge for use in an automatic door system comprising:

a compressible tube having first and second ends and sealed at both ends, the tube being subject to compression upon contact with an obstruction;

means for attaching the tube to a door edge;

conductor means sealed within the tube and extending between the first and second ends;

the conductor means comprising at least two conductors normally spaced when the tube is not compressed and arranged to make contact when the tube is compressed;

terminal conductors connected to the conductor means and extending through a wall of the tube proximate the first end for energizing the conductor means; and an active modulator sealed within the tube at the second end and electrically connected to the conductor means for generating a signal when the conductor means is energized and the tube is not compressed.

11. The invention as defined in claim 10 wherein the active modulator comprises an oscillator for generating an oscillating signal.

12. The invention as defined in claim 10 wherein the active modulator comprises an oscillator for periodically connecting the two conductors such that when a voltage is applied across the terminal conductors the voltage is periodically reduced to form an oscillating signal on the terminal conductors.

* * * * *